United States Patent [19]
Pone et al.

[11] Patent Number: 5,890,758
[45] Date of Patent: Apr. 6, 1999

[54] SEAT ASSEMBLY FOR A MOTOR VEHICLE RETRACTABLE BELOW THE VEHICLE FLOOR

[75] Inventors: Victor Pone, Clinton Township; Robert E. Schroder, Harrison Township, both of Mich.

[73] Assignee: Chrysler Corporation, Auburn Hills, Mich.

[21] Appl. No.: 914,676

[22] Filed: Aug. 19, 1997

[51] Int. Cl.⁶ ..................................................... A47C 9/06
[52] U.S. Cl. .............................................. 297/15; 296/66
[58] Field of Search ........................... 297/14, 15, 378.1, 297/344.1, 341, 331, 322, 316, 317, 324; 296/66, 65.1, 65.01; 248/429

[56] References Cited

U.S. PATENT DOCUMENTS

| 1,173,351 | 2/1916 | Herington . |
| 1,649,608 | 11/1927 | Matthews . |
| 3,171,682 | 3/1965 | Buser et al. . |
| 3,202,453 | 8/1965 | Richards . |
| 4,005,902 | 2/1977 | Balin . |
| 4,768,827 | 9/1988 | Musgrove . |
| 5,145,232 | 9/1992 | Dal Monte . |

FOREIGN PATENT DOCUMENTS

| 2536349 | 5/1984 | France . |
| 607328 | 12/1934 | Germany . |
| 165584 | 7/1921 | United Kingdom . |

*Primary Examiner*—Milton Nelson, Jr.
*Attorney, Agent, or Firm*—William J. Coughlin

[57] ABSTRACT

A retractable seat assembly for a motor vehicle is fully retractable below the level of the vehicle's floor. Typically, the invention involves a bench-type seat which is located behind the driver and passenger seats of a minivan or other vehicle. In an operative position, the seat has a generally upright seatback which cooperates with a lower horizontal member to provide the seating portion. In the non-operative or stored position, the entire seat is positioned below the level of the vehicle's floor. Preferably, the front and rear edges of the seat are interconnected to the vehicle body for pivotal movement about translatable axes.

17 Claims, 3 Drawing Sheets

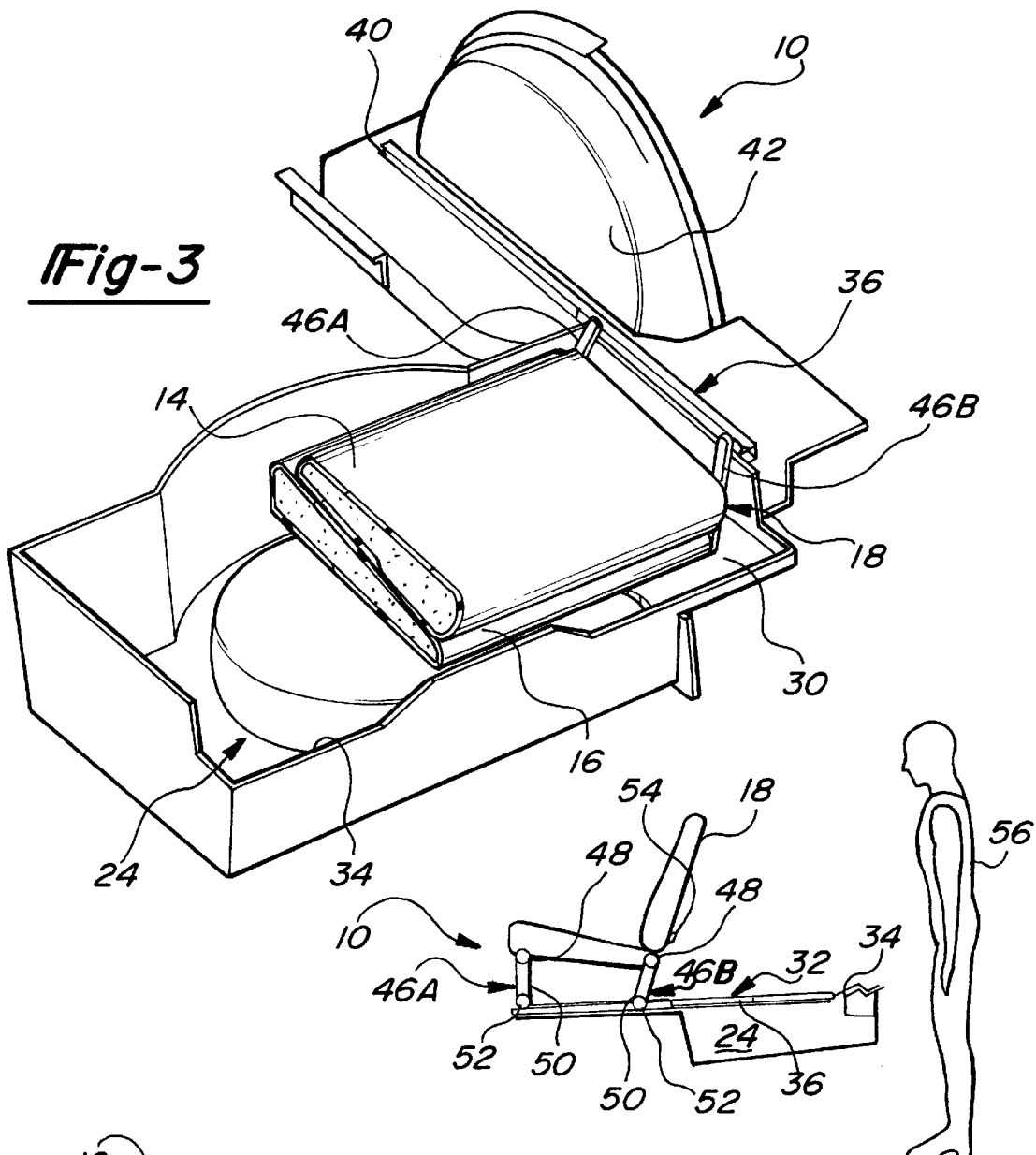
Fig-3
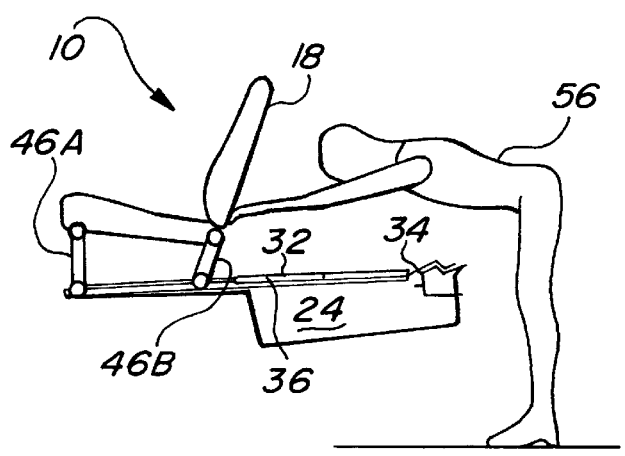
Fig-4A
Fig-4B

SEAT ASSEMBLY FOR A MOTOR VEHICLE RETRACTABLE BELOW THE VEHICLE FLOOR

BACKGROUND OF THE INVENTION

1. Technical Field

The present invention generally relates to seating systems for motor vehicles and, more particularly, relates to a seat assembly for a motor vehicle which is stored below the surface of the vehicle's floor. The invention also pertains to a related method.

2. Discussion

Automotive vehicles, such as minivans, vans, station wagons, sport utility vehicles and the like, are often purchased for their carrying capacity. This carrying capacity includes both the transportation of passengers and the transportation of various sizes and amounts of cargo. For this reason, many of these vehicles are provided with one or more retractable seats which enable increased storage capacity when there is a limited number of passengers.

To satisfy the conflicting goals of maximizing passenger and cargo capacity, it is known to provide a motor vehicle with a removable seat assembly. For example, many current minivans are equipped with a rear bench seat that can be removed in order to increase cargo capacity. While such arrangements have proven to be commercially successful, they are associated with disadvantages. For example, the weight and awkwardness of the vehicle seat often require two persons for removal. Additionally, it is not always convenient to store the seat assembly once removed from the motor vehicle.

To a more limited extent, it is also known to provide motor vehicles with retractable seats. For example, the prior art has shown retractable seat assemblies which fold into a seat storage compartment. One such example is shown in U.S. Pat. No. 5,195,795.

In view of known prior constructions, it remains desirable to provide a seat assembly retractable into a rearward storage area which does not restrict under seat storage.

SUMMARY OF THE INVENTION

The present invention provides a seat assembly for a motor vehicle stowable below the surface of the vehicle's floor which: (1) allows fore/aft seat adjustment to be incorporated into the travel of the stowage mechanism; (2) does not limit the storage of flat object under the seat assembly when the seat assembly is in it's operative position; (3) may be moved between stowed and operative positions by a fifth percentile female; and (4) effectively transfers seat belt loads to the vehicle body.

In one form, the present invention provides a retractable seat assembly for a motor vehicle having a body and a rearwardly located tub. The retractable seat assembly includes a seat and first and second swing arms. The first swing arm interconnects the seat to the body for pivotally movement about a first translatable point. The second swing arm interconnects the seat to the body for pivotal movement about a second translatable point.

In another form, the present invention provides a method of adjusting a seat for a motor vehicle between an operative position and an inoperative position below a floor of the vehicle. The method includes the general steps of: (1) mounting a front edge of the seat to the body for pivotal movement about a first translatable axis; (2) mounting a rear edge of the seat to the body for pivotal movement about a second translatable axis; (3) translating the first and second translatable axes; and (4) pivoting the front and rear edges of the seat about the first and second translatable axes, respectively, to thereby lower the seat into the tub.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a partial cut-away view similar to FIG. 2 illustrating the seat assembly in a stowed position.

FIGS. 4A–4F represent a series of simplified schematic views illustrating movement of the vehicle seat of the present invention between a full forward position and a stowed position.

DETAILED DESCRIPTION OF THE PREFERRED EMBODIMENT

Figure 1:
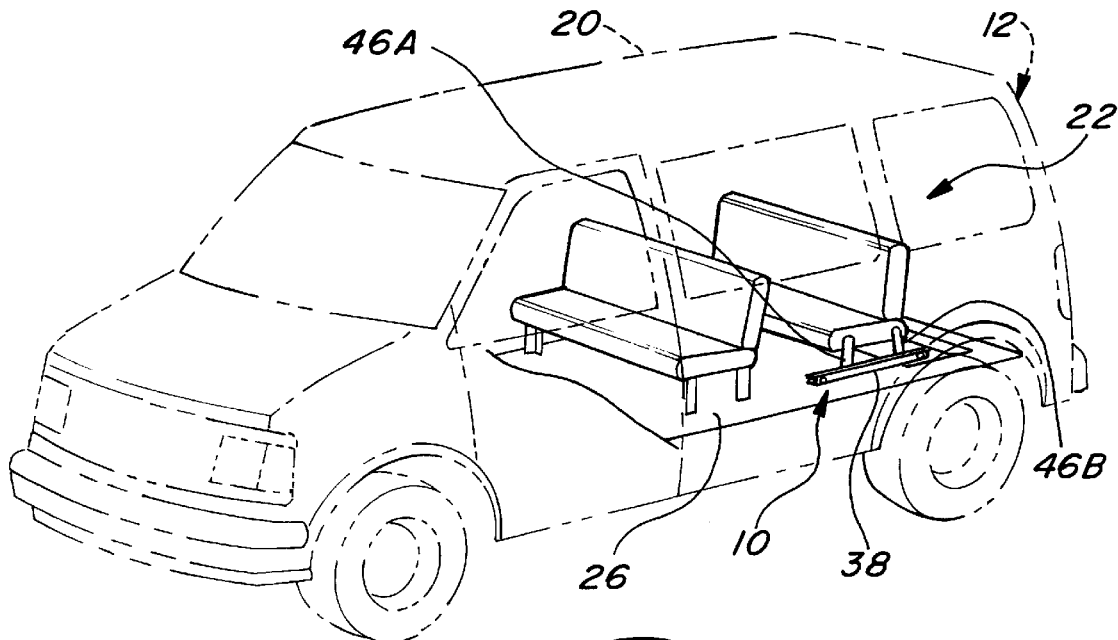
FIG. 1 is a perspective view of a vehicle seat storage system within a phantom vehicle in an operative position in accordance with the present invention.

Referring to FIG. 1, a retractable seat assembly 10 constructed in accordance with the teachings of a preferred embodiment of the present invention is shown operatively arranged with an automotive vehicle 12 otherwise shown in phantom. The automotive vehicle 12 illustrated is a minivan and should be considered to be merely exemplary. In this regard, it will become apparent to those skilled in the art that the teachings of the present invention are equally applicable for various other types of vehicles.

Figure 2:
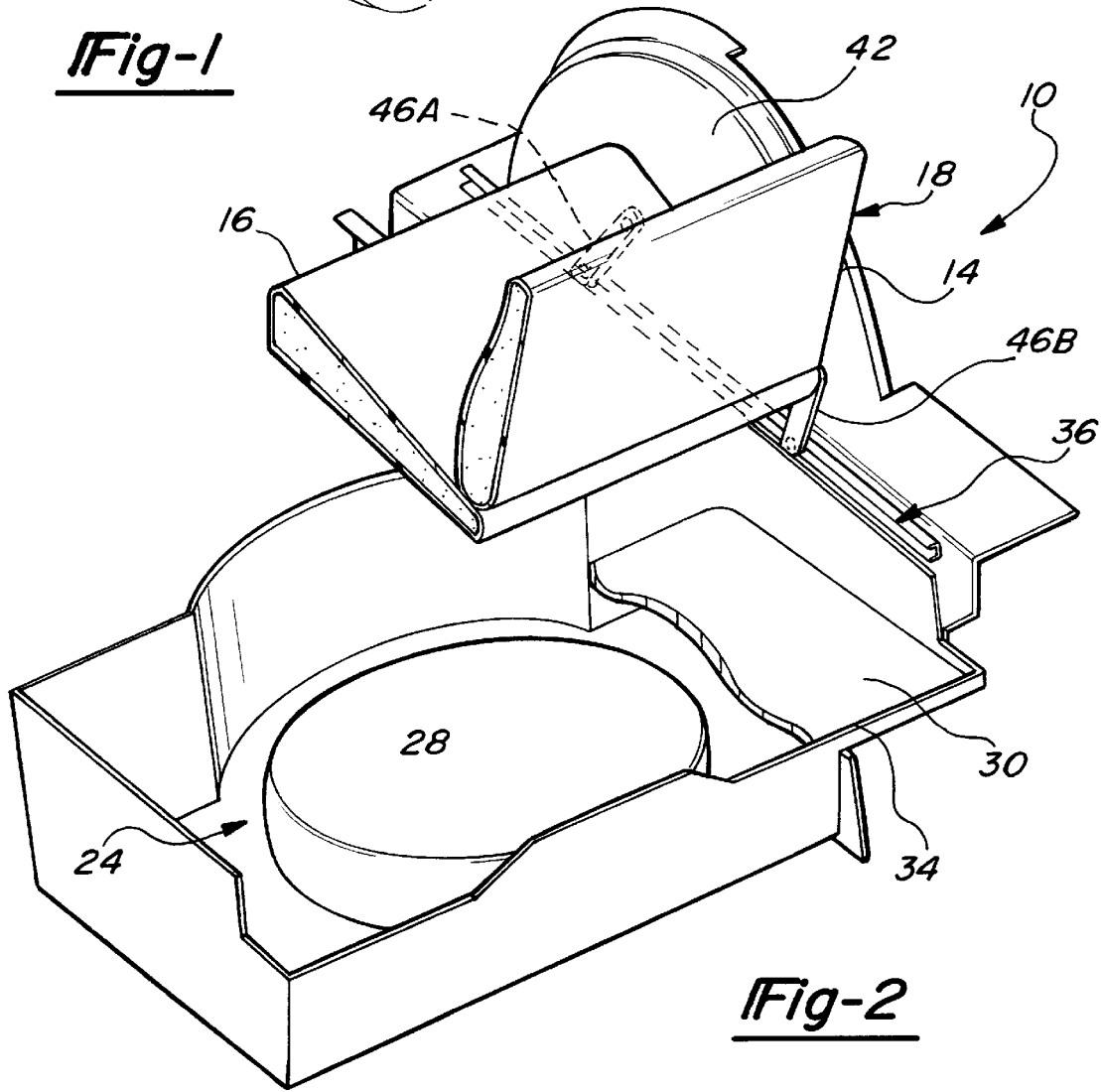
FIG. 2 is a perspective view of the vehicle seat storage system of the present invention, shown in partial cut-away.

With continued reference to FIG. 1 and additional reference to FIG. 2, the seat assembly 10 is shown to include a generally upright seatback member 14 and a lower horizontal member 16. In the exemplary embodiment illustrated, the generally upright seatback member 14 and horizontal member 16 cooperate to define a bench-type seat 18 positioned within the rear of the minivan 10. The seat 18 is further shown to include a manual operated release lever 54 which when activated permits the seatback 14 to be folded down atop the horizontal member 16 (e.g., as shown in FIG. 4E).

The vehicle 12 includes a body 20 which defines a rearward storage area 22. A storage compartment or tub 24, is integral with and positioned below a floor 26 of the vehicle 12 in a conventional manner. A spare tire 28 is stored within the tub 24. In the embodiment illustrated, a false bottom 30 conceals the spare tire 28. The storage compartment 24 has an overall rectangular shape which is slightly larger in area than the folded dimensions of the seat 18. A door 32 is hingedly attached to the vehicle's floor 26 adjacent the trailing edge 34 of the storage compartment for enclosing the tub 24.

The seating arrangement of the present invention is further shown to include first and second guide tracks 36 and 38 located adjacent to laterally opposed sides of the seat 18. Each of the first and second guide tracks 36 and 38, which are substantially identical in construction and function, is generally U-shaped in cross-section and partially defines a channel 40 which opens toward the interior of the vehicle 12. In the exemplary embodiment illustrated, the guide tracks 36 and 38 are welded, bolted, or otherwise suitably mounted to the wheel house structures 42 of the vehicle body 20. As will become more apparent below, the guide tracks 36 and 38 are configured to guide the seat 18 between an operative position and a stowed position. Because the seat 18 is supported by the first and second guide tracks 36 and 38 which are attached to the sides of the vehicle 12, the area below the seat 18 is unobstructed.

The seat 18 is interconnected to the first and second guide tracks 36 and 38 through two pairs of legs or swing arms. Each pair of swing arms includes a forward swing arm 46A and a rearward swing arm 46B. The two pairs of swing arms are substantially identical. Accordingly, the description herein will be primarily limited to one of the pairs. In this regard, the swing arms will be described from the perspective shown in FIGS. 1 and 4A–4F.

The forward and rearward swing arms 46A and 46B include a first end or upper end 48 and a second end or lower end 50 (identified in FIG. 4A). The first ends 48 of the swing arms 46A and 46B are pivotally interconnected to the horizontal member 16 of the seat 18 through a pivot pin (not specifically shown). The second ends 50 of the swing arms 46A and 46B are each attached to a roller bearing 52 which is operatively received in the associated guide track 36 or 38. This interconnection of the swing arms 46A and 46B through the roller bearings 52 also allows the swing arms 46A and 46B to be pivoted about an axis defined by their second ends 50.

As will become apparent below, the front swing arms 46A cooperate to define a movable axis about which a forward edge of the seat 18 may pivot. Similarly, the rear swing arms 46B cooperate to define a movable axis about which a rear edge of the seat 18 may pivot.

With specific reference to FIGS. 4A–4F operation of the seat assembly 10 of the present invention heretofore described will be detailed. FIGS. 4A–4F represent a series of simplified schematic views illustrating movement of the seat assembly 10 between its full forward position and its stowed position. A fifth percentile female 56 is shown in FIGS. 4A–4F operating the seat assembly 10.

Figure 4C:
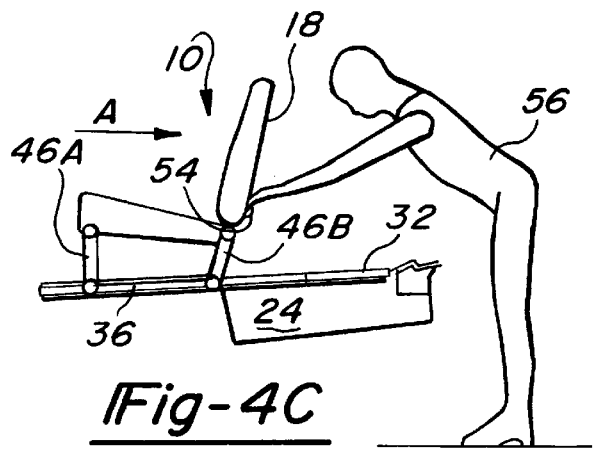
Figure 4D:
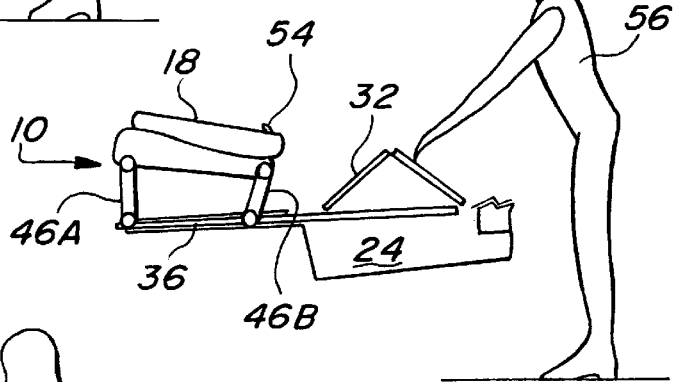
Figure 4E:
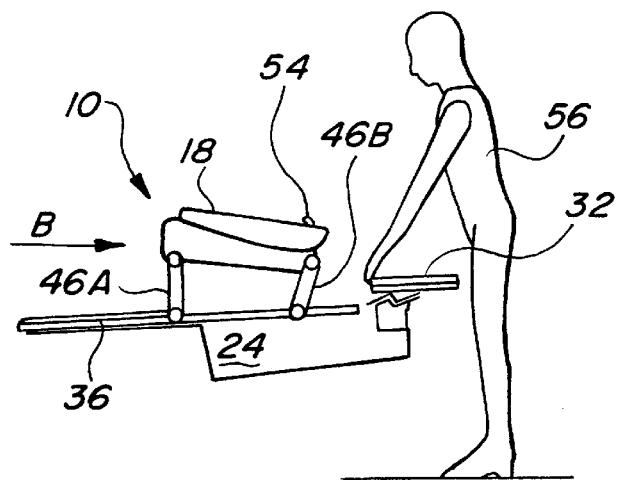
Figure 4F:
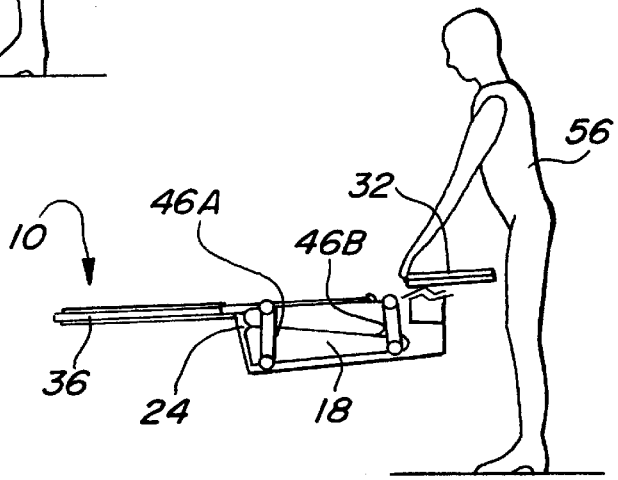

Beginning with the seat assembly 10 in its full forward operative position (e.g. as shown in FIG. 4A), the forward swing arm 46A is generally upright, and the rearward swing arm 46B is oriented at about 10° from the vertical. A conventional retention mechanism (not shown) retains the seat 18 in the full forward position. Upon manual release of the retention mechanism, the seat 18 can be linearly translated to an aft position (as shown in FIG. 4C). The direction of travel is indicated by arrow A.

When it is desired to stow the seat 18 within the storage tub 24, the door 32 is folded in half about a laterally extending centerline and pivoted about a point adjacent the trailing edge 34 of the storage compartment 24. Next, the release lever 54 is operated in a substantially conventional manner to permit the upright seatback member 14 to be folded down upon the horizontal member 16. As shown in FIG. 4E, the seat 18 is next translated in the direction of arrow B along the first and second guide tracks 36 and 38 until it is positioned above the storage tub 24. At this point, the front and rear swing arms 46A and 46B pivot through approximately 180° about their second ends 50. Simultaneously, the horizontal members 16 of the seat 18 is permitted to pivot about the first ends 48 of the swing arms 46 and 46B. As a result, the seat 18 is effectively lowered into the storage tub 24.

Finally, the door 32 can be returned to its closed position (e.g., FIG. 4C). The rearwardly spaced storage area 22 of the vehicle 12 has now been expanded to include the area previously occupied by the seat 18.

While the above description constitutes the preferred embodiment of the invention, it will be appreciated that the invention is susceptible to modification, variation, and change without departing from the proper scope or fair meaning of the accompanying claims. For example, it will be understood that the seat 18 can alternatively be moved from its operative position to its stowed position under electrical power.

We claim:

1. A seat storage system in combination with a motor vehicle, having a body defining an interior floor and a rear storage area, the seat storage system comprising:

a storage tub located below the interior floor of the rear storage area;

a retractable seat having a generally horizontal member and a generally upright seatback member pivotally attached thereto, said retractable seat being movable between an operative condition and a stored condition; and first and second guide tracks; and first and second pairs of swing arms each including first and second ends, said first end of each of said first and second pairs of swing arms being pivotally attached to said retractable seat, said second ends received by said first and second guide tracks, respectively, so as to permit movement therealong and pivoting of each swing arm about its second end.

2. The seat storage system in combination with a motor vehicle of claim 1, wherein said retractable seat is translatable relative to said first and second guide tracks between a fore position and an aft position.

3. The seat storage system in combination with a motor vehicle of claim 1, wherein each of said first and second pairs of swing arms pivots through approximately 180° as said retractable seat is moved from said operative condition to said stored condition.

4. The seat storage system in combination with a motor vehicle of claim 1, wherein said first and second guide tracks each open in a generally horizontal direction.

5. The seat storage system in combination with a motor vehicle of claim 1, wherein said first ends of said first and second pairs of swing arms are attached adjacent to laterally opposing sides of said retractable seat.

6. The seat storage system in combination with a motor vehicle of claim 1, wherein said retractable seat is solely interconnected to the body through said first and second pairs of swing arms.

7. A method of adjusting a seat for a motor vehicle having a body and a rearwardly located tub between an operative position and a stowed inoperative position below a floor of the vehicle, the method including the steps of:

mounting a front edge of the seat to the body for pivotal movement about a first translatable axis;

mounting a rear edge of the seat to the body for pivotal movement about a second translatable axis;

translating said first and second translatable axes; and pivoting the front and rear edges of the seat about said first and second translatable axes, respectively, to thereby lower the seat into the tub;

wherein the step of translating said first and second translatable axes includes the step of moving the seat between a fore position and an aft position.

8. The method of adjusting a seat for a motor vehicle of claim 7, wherein the step of mounting a front edge of the seat to the body for pivotal movement about a first translatable axis includes the steps of attaching first and second guide tracks to the body adjacent laterally opposing sides of the seat, and interconnecting the seat with said first and second guide tracks through first and second swing arms, respectively.

9. The method of adjusting a seat for a motor vehicle of claim 8, wherein the step of interconnecting the seat with said first and second guide tracks through first and second swing arms includes the step of pivotally interconnecting a first end of each of said swing arms to the seat and pivotally attaching a second end of each of said swing arms to one of said first and second guide tracks.

10. The method of adjusting a seat for a motor vehicle of claim 9, wherein the step of pivoting the front and rear edges of the seat about said first and second translatable axes, respectively, to thereby lower the seat into the tub includes the step of rotating each swing arm through approximately 180° about its second end.

11. A seat storage system in combination with a motor vehicle having a body defining an interior floor and a rear storage area, the seat storage system comprising:

a retractable seat movable between an operative condition and a stored condition;

first and second guide tracks attached to the motor vehicle; and first and second pairs of swing arms each including first and second ends, said first end of each of said first and second pairs of swing arms being pivotally attached to said retractable seat, said second ends received by said first and second guide tracks, respectively, so as to permit horizontal movement therealong and pivoting of each swing arm of said first and second pairs of swing arms about its second end.

12. The seat storage system in combination with a motor vehicle of claim 11, wherein said retractable seat is translatable relative to said first and second guide tracks between a fore position and an aft position.

13. The seat storage system in combination with a motor vehicle of claim 11, wherein each of said first and second pairs of swing arms pivot through approximately 180° as said retractable seat is moved from said operative condition to said stored condition.

14. The seat storage system in combination with a motor vehicle of claim 11, wherein said first and second guide tracks each open in a generally horizontal direction.

15. The seat storage system in combination with a motor vehicle of claim 11, wherein said first ends of said first and second pairs of swing arms are attached adjacent to laterally opposing sides of said retractable seat.

16. The seat storage system in combination with a motor vehicle of claim 11, wherein said retractable seat is solely interconnected to the body through said first and second pairs of swing arms and said first and second guide tracks.

17. The seat storage system in combination with a motor vehicle of claim 11, further comprising a storage tub located below the interior floor of the rear storage area, said retractable seat disposed in said storage tub when in said stored condition.

* * * * *

UNITED STATES PATENT AND TRADEMARK OFFICE
CERTIFICATE OF CORRECTION

PATENT NO. : 5,890,758
DATED : April 6, 1999
INVENTOR(S) : Victor Pone, et. al.

It is certified that error appears in the above-indentified patent and that said Letters Patent is hereby corrected as shown below:

Title page, item [75], inventor: should read --Schroeder--.

Signed and Sealed this

Nineteenth Day of October, 1999

Attest:

Q. TODD DICKINSON

Attesting Officer

Acting Commissioner of Patents and Trademarks